United States Patent
Wang (10) Patent No.: US 10,319,095 B2
(45) Date of Patent: Jun. 11, 2019

(54) METHOD, AN APPARATUS AND A COMPUTER PROGRAM PRODUCT FOR VIDEO OBJECT SEGMENTATION

(71) Applicant: Nokia Technologies Oy, Espoo (FI)

(72) Inventor: Tinghuai Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/597,480

(22) Filed: May 17, 2017

(65) Prior Publication Data
US 2017/0345153 A1     Nov. 30, 2017

(30) Foreign Application Priority Data

May 26, 2016 (GB) .................................. 1609263.7

(51) Int. Cl.
| | |
|---|---|
| *G06T 7/11* | (2017.01) |
| *G06T 7/70* | (2017.01) |
| *G06K 9/46* | (2006.01) |
| *G06T 7/20* | (2017.01) |
| *G06T 7/215* | (2017.01) |
| *G06T 7/246* | (2017.01) |

(52) U.S. Cl.
CPC .............. *G06T 7/11* (2017.01); *G06K 9/4604* (2013.01); *G06T 7/20* (2013.01); *G06T 7/215* (2017.01); *G06T 7/246* (2017.01); *G06T 7/70* (2017.01); *G06T 2207/10016* (2013.01); *G06T 2207/20084* (2013.01)

(58) Field of Classification Search
CPC . G06T 7/11; G06T 7/246; G06T 7/215; G06T 7/20; G06T 7/70; G06T 2207/20084; G06T 2207/10016; G06K 9/4604
See application file for complete search history.

(56) References Cited

U.S. PATENT DOCUMENTS

| | | |
|---|---|---|
| 6,999,620 B1 | 2/2006 | Harville |
| 2016/0335478 A1* | 11/2016 | Bredno .............. G06K 9/00147 |

FOREIGN PATENT DOCUMENTS

WO     2008/008046 A1     1/2008

OTHER PUBLICATIONS

Yang, Michael Ying, et al. "Temporally object-based video co-segmentation." International Symposium on Visual Computing. Springer, Cham, 2015. (Year: 2015).*

Gu et al., "Semantic video object segmentation and tracking using mathematical morphology and perspective motion model", International Conference on Image Processing, Oct. 26-29, 1997, pp. 514-517.

(Continued)

*Primary Examiner* — Amandeep Saini
(74) *Attorney, Agent, or Firm* — Alston & Bird LLP (57) ABSTRACT

The invention relates to a method and an apparatus implementing the method. The method comprises extracting region proposals from a media content; selecting a set of region proposals corresponding to an object in the media content; identifying objects of interest; determining an object-specific representation by an iterative tracking method; sampling positive examples from the set of tracked region proposal groups obtained from the iterative tracking method; and performing object segmentation.

20 Claims, 5 Drawing Sheets

(56) References Cited

OTHER PUBLICATIONS

Hartmann et al., "Weakly supervised learning of object segmentations from web-scale video", Proceedings of the 12th international conference on Computer Vision, vol. 1, 2012, pp. 1-10.
Taylor et al., "Semantic video segmentation from occlusion relations within a convex optimization framework", Energy Minimization Methods in Computer Vision and Pattern Recognition, 2013, pp. 1-14.
Tang et al., "Discriminative segment annotation in weakly labeled video", IEEE Conference on Computer Vision and Pattern Recognition, 2013, 8 Pages.
Liu et al., "Weakly supervised multiclass video segmentation", IEEE Conference on Computer Vision and Pattern Recognition, Jun. 23-28, 2014, pp. 57-64.
Zhang et al., "Semantic object segmentation via detection in weakly labeled video", IEEE Conference on Computer Vision and Pattern Recognition, 2015, pp. 3641-3649.
Arbeláez et al., "Multiscale combinatorial grouping", IEEE Conference on Computer Vision and Pattern Recognition, 2014, 8 Pages.
Weinzaepfel et al., "Learning to detect motion boundaries", IEEE Conference on Computer Vision and Pattern Recognition, 2015, pp. 2578-2586.
Simonyan et al., "Very deep convolutional networks for large-scale image recognition" International Conference on Learning Representations, 2015, pp. 1-14.
Boykov et al., "Fast approximate energy minimization via graph cuts", IEEE Transactions on Pattern Analysis and Machine Intelligence, vol. 23, No. 11, Nov. 2001, pp. 1-18.
Tokmakov et al., "Weakly-supervised Semantic Segmentation Using Motion Cues", European Conference on Computer Vision, 2016, pp. 1-12.
He et al., "RGBD Semantic Segmentation Using Spatio-temporal Data driven Pooling", Computer Vision and Pattern Recognition, 2016, pp. 1-16.
Bency et al., "Weakly Supervised Localization Using Deep Feature Maps", Computer Vision and Pattern Recognition, 2016, pp. 1-20.
Girshick et al., "Rich Feature Hierarchies for Accurate Object Detection and Semantic Segmentation", IEEE conference on Computer Vision and Pattern Recognition, 2014, 8 Pages.
Wei et al., "STC: a Simple to Complex Framework for Weakly-supervised Semantic Segmentation", IEEE Transactions on Pattern Analysis and Machine Intelligence, 2015, pp. 1-8.
Search Report received for corresponding United Kingdom Patent Application No. 1609263.7, dated Nov. 17, 2016, 5 pages.
Kuznetsova, A et al. "Expanding object detector's Horizon: Incremental learning framework for objects detection in videos", 2015 IEEE Conference on Computer Vision and Pattern Recognition (CVPR), IEEE, dated Jun. 7, 2015, pp. 28-36.
Perazzi, F et al. "Fully connected object proposals for video segmentation", 2015 IEEE International Conference on Computer Vision (ICCV). IEEE, dated Dec. 7, 2015, pp. 3227-3234.
Wang, H et al. "Primary object discovery and segmentation in videos via graph-based transductive inference", Computer Vision and Image Understanding, vol. 143, dated Feb. 29, 2016, pp. 159-172.
Extended Eurepean search Report for European Application No. 17167665.3 dated Sep. 27, 2017.

* cited by examiner

METHOD, AN APPARATUS AND A COMPUTER PROGRAM PRODUCT FOR VIDEO OBJECT SEGMENTATION

TECHNICAL FIELD

The present solution generally relates to a method for analyzing media content, particularly for segmenting objects from a video.

BACKGROUND

Many practical applications rely on the availability of semantic information about the content of media, such as images, videos, etc. Semantic information is represented by metadata which may express the type of scene, the occurrence of a specific action/activity, the presence of a specific object, etc. Such semantic information can be obtained by analysing the media.

The analysis of media is a fundamental problem which has not yet been completely solved. This is especially true when considering the extraction of high-level semantics, such as object detection and recognition, scene classification (e.g., sport type classification), action/activity recognition, etc.

Recently, the development of various neural network techniques has enabled learning to recognize image content directly from the raw image data, whereas previous techniques consisted of learning to recognize image content by comparing the content against manually trained image features. Very recently, neural networks have been adapted to take advantage of visual spatial attention, i.e. the manner how humans conceive a new environment by focusing first to a limited spatial region of the scene for a short moment and then repeating this for a few more spatial regions in the scene in order to obtain an understanding of the semantics in the scene.

However, while providing good recognition accuracy, the semantic understanding of the image content in the known systems is rather limited. Also the computational complexity of these systems, despite of significant improvements recently, is still rather high.

SUMMARY

Now there has been invented an improved method and technical equipment implementing the method, by which the above problems are alleviated. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising extracting region proposals from a media content; selecting a set of region proposals corresponding to an object in the media content; identifying objects of interest; determining an object-specific representation by an iterative tracking method; sampling positive examples from the set of tracked region proposal groups obtained from the iterative tracking method; and performing object segmentation.

According to an embodiment, the method further comprises determining motion information by creating a binary map.

According to an embodiment, the method further comprises determining a region-wise score by combining a static objectness score associated with each proposal from the extracted region proposals with an average and total amount of motion information encompassed by region in the created binary map.

According to an embodiment, the method further comprises determining a confidence map over the region-wise score and a classification confidence.

According to an embodiment, the iterative tracking method comprises forming a pool of candidates by taking region proposals from a plurality of frames and selecting a region proposal on the earliest frame; tracking the selected region until the last frame, choosing all the region proposals overlapping with the tracked region to form a group to be removed from the pool, repeating the steps until the pool is empty.

According to an embodiment, the method further comprises determining a stability indicator for each group by a number of overlapped region proposals during tracking related to other groups.

According to an embodiment, the method further comprises sampling for each group region proposals proportional to group's stability indicator.

According to a second aspect, there is provided an apparatus comprising at least one processor and at least one memory, said at least one memory stored with code thereon, which when executed by said at least one processor, causes the apparatus to extract region proposals from a media content; select a set of region proposals corresponding to an object in the media content; identify objects of interest; determine an object-specific representation by an iterative tracking method; sample positive examples from the set of tracked region proposal groups obtained from the iterative tracking method; and perform object segmentation.

According to an embodiment, the apparatus further comprises a computer program to cause the apparatus to determine motion information by creating a binary map.

According to an embodiment, the apparatus further comprises a computer program to cause the apparatus to determine a region-wise score by combining a static objectness score associated with each proposal from the extracted region proposals with an average and total amount of motion information encompassed by region in the created binary map.

According to an embodiment, the apparatus further comprises a computer program to cause the apparatus to determine a confidence map over the region-wise score and a classification confidence.

According to an embodiment, the apparatus further comprises a computer program to cause the apparatus to perform iterative tracking by forming a pool of candidates by taking region proposals from a plurality of frames and selecting a region proposal on the earliest frame; tracking the selected region until the last frame; choosing all the region proposals overlapping with the tracked region to form a group to be removed from the pool: and repeating the steps until the pool is empty.

According to an embodiment, the apparatus further comprises a computer program to cause the apparatus to determining a stability indicator for each group by a number of overlapped region proposals during tracking related to other groups.

According to an embodiment, the apparatus further comprises a computer program to cause the apparatus to sample for each group region proposals proportional to group's stability indicator.

According to a third aspect, there is provided a computer program product embodied on a non-transitory computer readable medium, comprising computer program code configured to, when executed on at least one processor, cause an apparatus or a system to extract region proposals from a media content; select a set of region proposals corresponding to an object in the media content; identify objects of interest; determine an object-specific representation by an iterative tracking method; sample positive examples from the set of tracked region proposal groups obtained from the iterative tracking method; and perform object segmentation.

According to a fourth aspect, there is provided an apparatus, comprising means for extracting region proposals from a media content; means for selecting a set of region proposals corresponding to an object in the media content; means for identifying objects of interest; means for determining an object-specific representation by an iterative tracking method; means for sampling positive examples from the set of tracked region proposal groups obtained from the iterative tracking method; and means for performing object segmentation.

According to an embodiment, the apparatus further comprises means for determining motion information by creating a binary map.

According to an embodiment, the apparatus further comprises means for determining a region-wise score by combining a static objectness score associated with each proposal from the extracted region proposals with an average and total amount of motion information encompassed by region in the created binary map.

According to an embodiment, the apparatus further comprises means for determining a confidence map over the region-wise score and a classification confidence.

According to an embodiment, the apparatus further comprises means for performing iterative tracking by forming a pool of candidates by taking region proposals from a plurality of frames and selecting a region proposal on the earliest frame; by tracking the selected region until the last frame; by choosing all the region proposals overlapping with the tracked region to form a group to be removed from the pool: and by repeating the steps until the pool is empty.

DESCRIPTION OF THE DRAWINGS

In the following, various embodiments of the invention will be described in more detail with reference to the appended drawings, in which.

DESCRIPTION OF EMBODIMENTS

Figure 1:
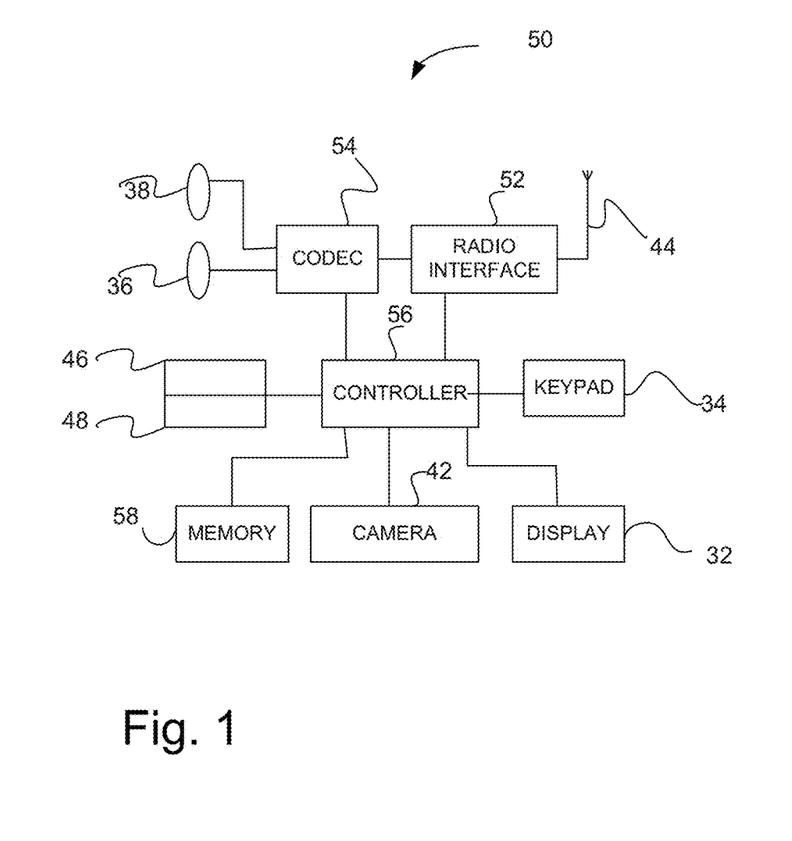
FIG. 1 shows an apparatus according to an embodiment as a simplified block chart.
Figure 2:
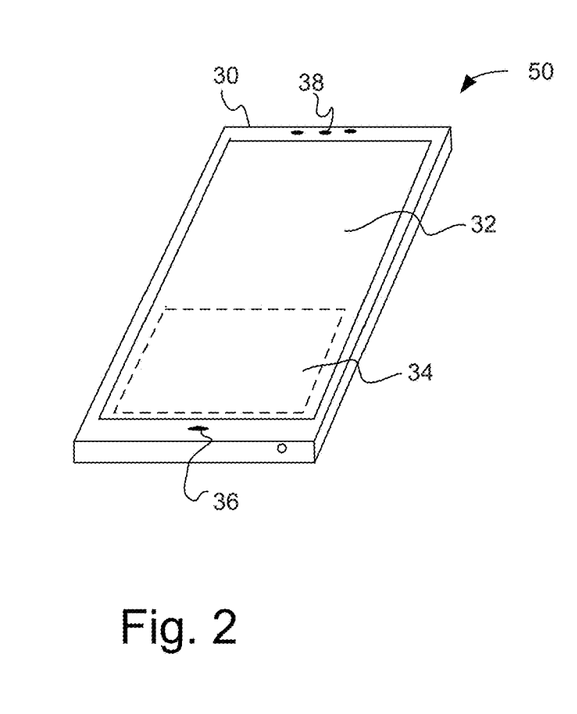
FIG. 2 shows a layout of an apparatus according to an embodiment.

The following describes in further detail suitable apparatus and possible mechanisms for analyzing media content. In this regard reference is first made to FIGS. 1 and 2, where FIG. 1 shows a block diagram of an apparatus according to an example embodiment as a schematic block diagram of an electronic device 50. FIG. 2 shows a layout of an apparatus according to an example embodiment. The elements of FIGS. 1 and 2 will be explained next.

The electronic device 50 may for example be a mobile terminal, a user equipment of a wireless communication system, a smartphone, a camera device, a computer, or a head-mounted display device. However, it would be appreciated that embodiments of the invention may be implemented within any electronic device or apparatus.

The apparatus 50 may comprise a housing 30 for incorporating and protecting the device. The apparatus 50 further may comprise a display 32 e.g. in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments, the apparatus 50 may comprise more than one camera, or one camera sensor may be integrated with an optics enabling the capture of more than one views with the camera sensor. The apparatus 50 may further comprise an infrared port for short range line of sight communication to other devices. In other embodiments the apparatus 50 may further comprise any suitable short range communication solution such as for example a Bluetooth wireless connection or a USB (Universal Serial Bus)/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage.

Figure 3:
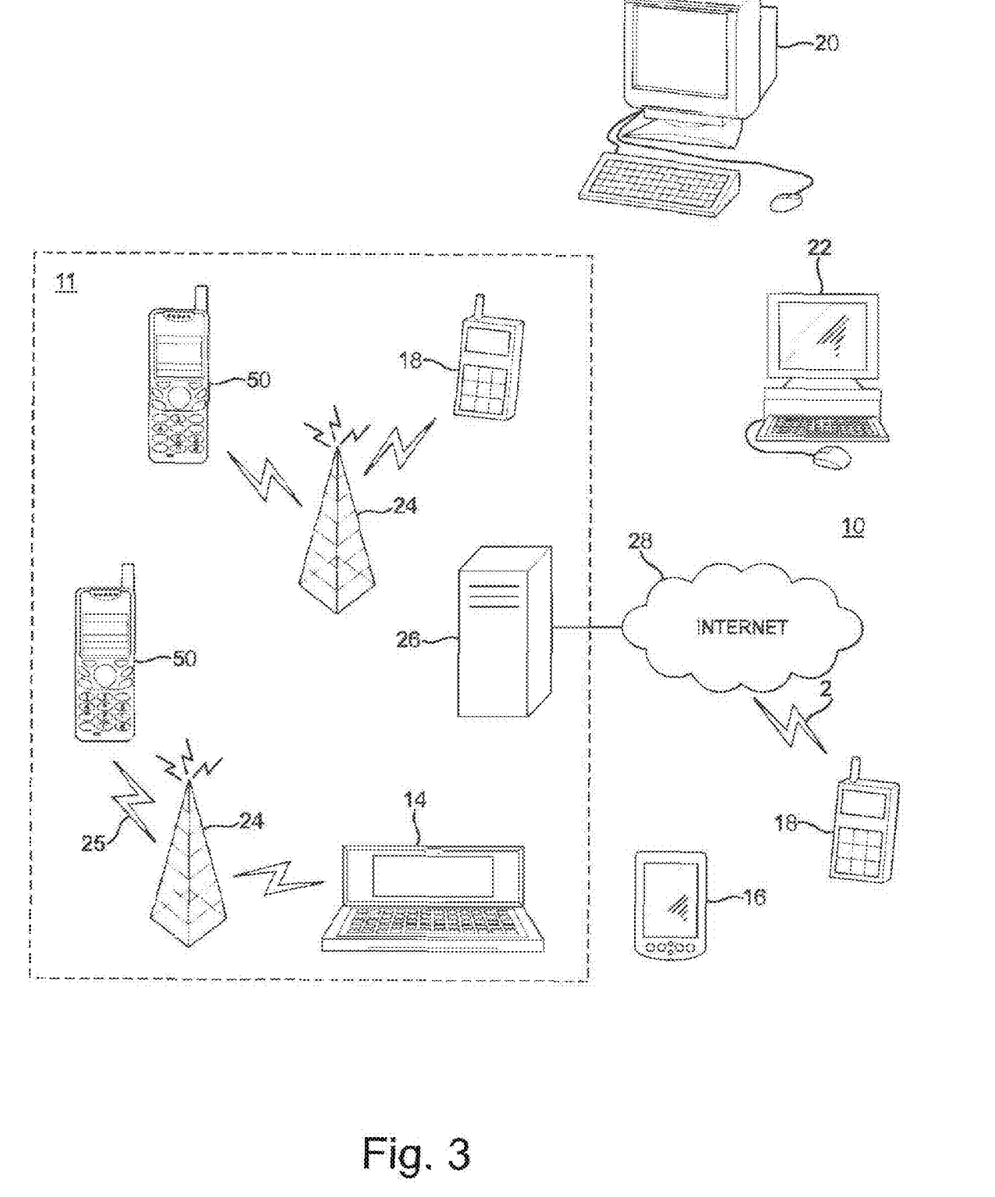
FIG. 3 shows a system according to an embodiment.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM (global systems for mobile communications), UMTS (universal mobile telecommunications system), CDMA (code division multiple access) network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs (Digital Signal Processor) and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

The present embodiments relate to linking image classification with video object segmentation and transferring efficiently learned features from one task to another, since that image-level labels are more abundant than pixel-level labels. Using middle-level representation, i.e. region proposals, the present embodiments successfully circumvents the coarse output problem of convolutional neural networks (CNN). Employing visual tracking, the present embodiments learn a spatio-temporal distribution of the same object in deep feature space.

The media content being analyzed according to an embodiment is video. The video may be associated with semantic tags which suggest the objects appearing in the video. Unlike image classification or object detection, semantic objet segmentation aims at assigning class label for pixels belonging to the objects. One potential challenge of using CNN image classifier to detect object is that the CNN network has large receptive field which results in very coarse output. Taking VGG-16 (Visual Geometry Group) net as an example, the input image size is fixed to 224*224 which gives one single prediction. To deal with this challenge, a category-independent bottom-up object proposal are adopted to bridge the gap.

Figure 4:
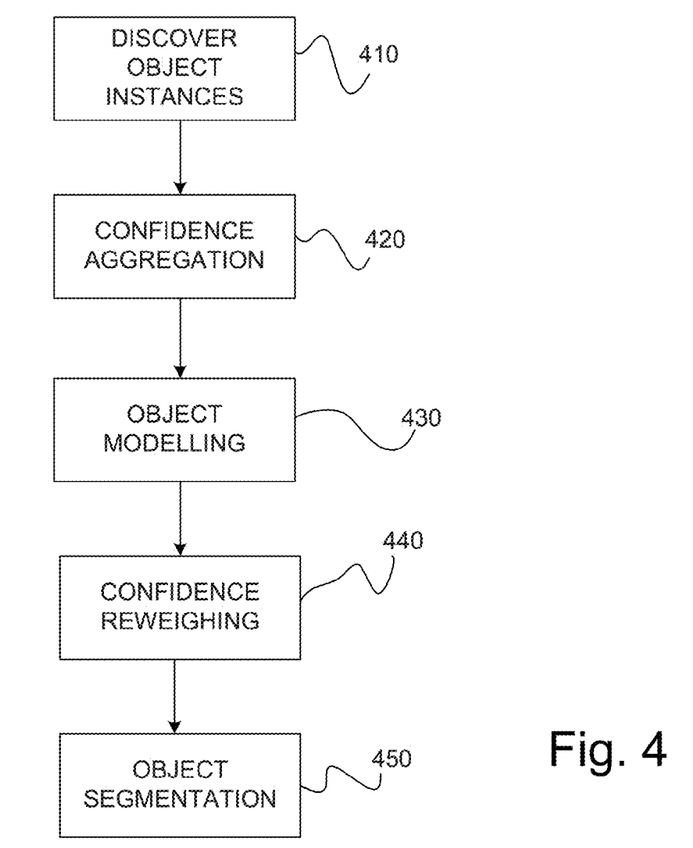
FIG. 4 shows a method according to an embodiment.

The method according to an embodiment is shown in FIG. 4. The method generally comprises discovering object instances 410; confidence aggregation 420; object modelling 430; confidence reweighing 440; and object segmentation 450. Each of the steps can be implemented by a respective module of a computer system.

In the following, each of the aforementioned method steps is described in more detailed manner.

Discovering Object Instances

The present embodiments are targeted to producing segmentations rather than just bounding boxes, whereby region proposals are required. These region candidates are considered as a putative object hypothesis. Region proposals can be extracted from the source image by using region proposal method of related technology. An example of a region proposal method is disclosed by Arbeláez, P., Pont-Tuset, J., Barron, J., Marques, F. and Malik, J., in "Multiscale combinatorial grouping." (2014). Applying image classification on a large pool of region proposals cannot give reliable results as many region proposals are overlapping on the same object with multiple scales, which returns a large number of noisy positive detections.

In video, motion information is the relatively salient cue for objects on image sequence. There are various methods for estimating motion boundaries. The motion cues can be estimated by casting a number of rays from every pixel, if the majority of the rays intersect with the estimated motion boundaries an even number of times, the pixel is deemed outside the motion boundary; otherwise it is considered inside the moving object. This results in a binary map indicating whether each pixel is inside (1) or outside (0) the moving object. The binary map may be used as the motion information.

According to an embodiment, region-wise score comprising static objectness score and motion score is determined. The region-wise score $s_r$ may be determined by combining the static objectness score $A(r)$ associated with each region proposal r from the region proposal method with the average (by area) and total amount of motion information (i.e. motion score) encompassed by region proposal r. In the following equation M stands for binary map being generated in the previous step, the binary map M indicating whether a pixel is inside or outside the moving object.

$$s_r = A(r) + \mathrm{Avg}(M(r)) \cdot \mathrm{Sum}(M(r)) \qquad \text{Equation 1.}$$

The top scoring proposals may be taken with an adaptive threshold based on mean and standard deviation values, typically dozens of proposals selected into the next stage. Specifically, the threshold on frame t can be defined initially as $$Thr_1 = Mean(s_r) + Std(s_r)$$

A set of previous thresholds are kept on frames 1 ... t−1 as Thr=(Thr$_1$, ... Thr$_{t-1}$. After adding the current threshold into the set, the current threshold is updated as the media value of the set, i.e., Thr$_t$=median(Thr). This adaptive thresholding scheme not only considers the statistics on the local frame but also accounts for the statistics from historical frames.

The selected set of region proposals on each frame may correspond to various objects present in the video. In order to identify the objects of interest indicated by the video tags, an object classification needs to be performed. CNN-based image classifiers of related technology can be employed for the object classification. An example of a known classification architecture is disclosed by Simonyan, K., and Zisserman, A. in "Very deep convolutional networks for large-scale image recognition" (2014).

$$C^t = \frac{1}{\sum_{r \in R^t} s_r \cdot c_r} \odot \sum_{r \in R^t} s_r \cdot c_r \odot R_r$$

Classification Confidence Aggregation

In order to be processed with CNN-based image classifier, at first the image data is warped in a tight bounding box around each region proposal to the required size, regardless its original size. After the classification, the confidence of regions with respect to the specific class labels associated with the video is collected, and a set of scored regions is formed. Positive detections are those whose confidence is higher than a predefined threshold (e.g. 0.003). However, higher confidence does not necessarily correspond to good proposals. This may relate to the nature of image classification where the image frame is quite often much larger than the tight bounding box of the object. Additionally, the same bounding box may encompass multiple overlapping regions proposals.

According to an embodiment, the region-wise score, confidence and their spatial extent are aggregated. The following operation is performed over the region-wise score ($s_r$) and classification confidence ($C_r$) of all proposals to compute a confidence map $C^t$:

where $\odot$ stands for element-wise multiplication, $R_r$ denotes the binary map of region r, and $R^t$ represents the set of all candidate proposals from frame t.

The resulted confidence map $C^t$ accounts for the region-wise score and confidence and their spatial extent. The intuition is that good detections coincide with each other in the spatial domain, and their contribution to the final confidence map are proportional to their region-wise score and confidence.

A new set of region proposals may be generated by slicing the confidence map $C^t$. The level of slicing is gradually increased from 0 to 1. Each disconnected regions sliced at each level form the new proposals. The score of each region is computed by averaging the confidence values enclosed by each region.

Object Modelling Using Deep Feature

Next, an object-specific representation is examined. The object-specific presentation captures the distribution of the same object instances in deep feature space from continuous frames. Although it is not possible to learn a complete representation of the object from one single frame, multiple frames containing different 2D projections of the same object provide more comprehensive information.

To capture the accurate region-level instances of the object, visual tracking techniques are utilized to enforce spatial and temporal consistency. Visual tracking, on one hand, can eliminate false positives since spurious detections may not appear very often on other frames; on the other hand, consistent proposals describing the same object instances can be extracted.

To achieve these goals, an iterative tracking and eliminating method is disclosed. Firstly, a pool of candidates is formed by taking region proposals from a plurality of frames, e.g. all frames, from which a region proposal on the earliest frame is randomly selected. This selected region may be tracked using visual tracker until the last frame. All the region proposals in the pool whose bounding box has a substantial intersection-over-union (IoU) overlap (e.g. 0.5) with the tracked bounding box may be chosen to form a group and consequently removed from the pool. This is an iterative process until the pool is empty. The single-frame group can be discarded. For each group, a stability indicator $d_{gi}$ can be computed, which is measured by a number of overlapped region proposals during tracking in relation to other groups. $g_i$ stands for the number of overlapped region proposals during tracking for group i; G indicates the whole set of $g_i$, i.e. the number of overlapped region proposals of all $$d_{gi} = 1 - \exp(-|g_i|^2 / <|G|>^2)$$

tracked groups, G={$g_1, g_2, \ldots g_n$}: where < > denotes the expectation.

Confidence Reweighing

In this step, a discriminative object-specific representation is examined such that the good proposals are closer to each other than to the bad or false positive proposals in the deep feature space. At first, positive examples are sampled from the set of tracked region proposal groups T. For each group, region proposals are sampled proportional to its stability indicator, and sampling more instances from more stable groups, and fewer instances from less stable groups. The negative examples may be randomly sampled bounding boxes around the positive examples, with an IoU overlap less than 0.3 with the corresponding positive examples.

Then, deep features may be extracted by warping all training instances and forward propagating them through the VGG-16 net and extracting a 4096 dimensional feature vector from fc6 layer. Once features are extracted, one linear SVM (Support Vector Machine) per class may be trained with training labels applied.

The goal is to reweigh the previously generated proposals given the learned object-specific representation in a deep feature space. To this end, 4096-dimensional feature vector of the proposals may be extracted and classification confidence $c_r$ is produced using the SVM trained for that class:

$$c_r = w_k \cdot x_r + b_k$$

where $w_k$ and $b_k$ are weights and bias for class k, $x_r$ is the feature vector for region r.

The averaging strategy defined in Equation 1 may be applied again to aggregate the region-wise confidence and their spatial extent to compute and update the confidence map $C^t$. This confidence map takes the local information (single frame) but also the global (multiple frames) information.

Video Object Segmentation

In this step, object segmentation is performed by connecting frames temporally with optical flow displacement to form a space-time graph g=(V, ε). Each of the nodes in this graph is a superpixel, and edges are set to be the spatially neighbouring superpixel within the same frame and the temporal neighbors in adjacent frames. Temporal neighbours are decided if two superpixels are temporally connected by at least one optical motion vector.

Video segmentation is formulated as a superpixel-labelling problem of assigning each superpixel with a label which represents different objects and background respectively. The energy function that is minimized in this step to achieve in optimal labelling takes the similar from to multi-label graph cut:

$$E(x) = \sum_{i \in V} D_i(x_i) + \alpha \sum_{i \in V, j \in N_i} V_{i,j}(x_i, x_j)$$

where $N_i$ is the set of pixels neighboring to pixel i in the graph and α is a parameter. The unary term $D_i(x_i)$ defines the cost of assigning label $x_i$ to superpixel i, which may be defined based on the confidence maps computed in the object modelling step:

$$D_i(x_i) = -\log(U_i^c(x_i)) - w \cdot \log(U_i^s(x_i))$$

where $U_i^c(x_i)$ indicates the likelihood of observing superpixel i given label $x_i$ based on GMM colour models of objects and background; the GMM colour models are estimated by sampling pixels belonging to objects and background based on the confidence map; $U_i^s(x_i)$ stands for the semantic confidence of superpixel i by averaging the confidence map inside superpixel i; w is a parameter. The pairwise term is defined as:

$$V_{i,j}(x_i, x_j) = [x_i \neq x_j] \exp\left(-\frac{(c_i - c_j)^2}{2\beta}\right)$$

where [ ] denotes the indicator function taking values 1 (if true) or 0 (otherwise), $(c_i - c_j)^2$ is the squared Euclidean distance between two adjacent superpixels in CIE LAB color space, and $\beta = \langle (c_i - c_j)^2 \rangle$ with $\langle \rangle$ denoting the expectation or average. The alpha-expansion optimization is performed on the graph to obtain the final segmentation.

Figure 5:
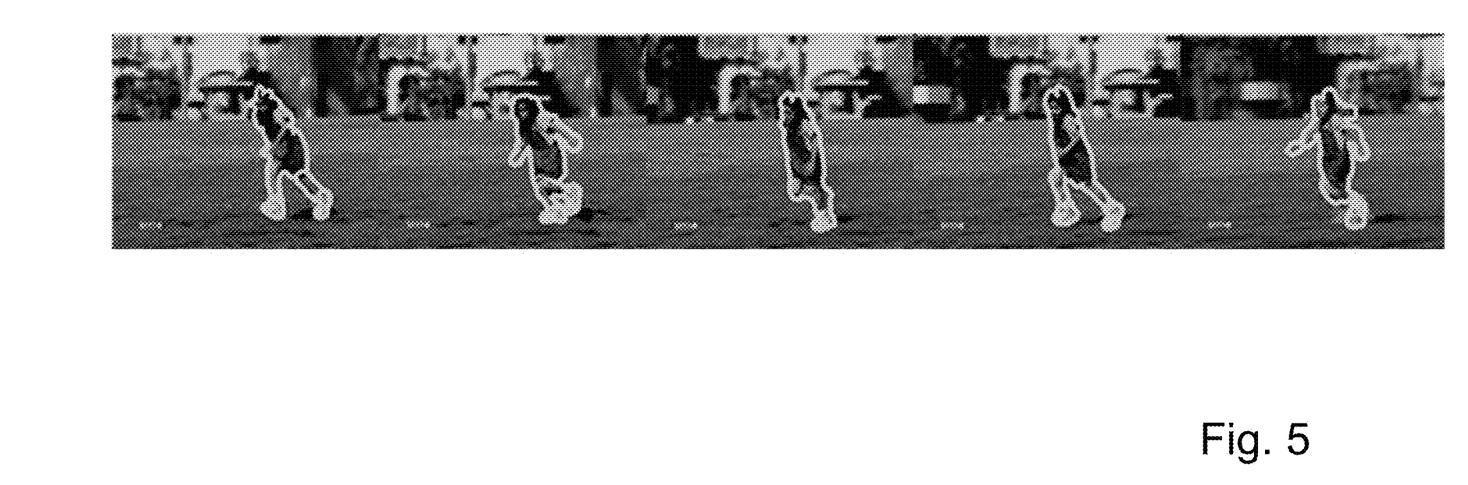
FIG. 5 shows an example of segmentation results.

FIG. 5 shows an example of results of the segmentation on a video tagged with information "person".

Figure 6:
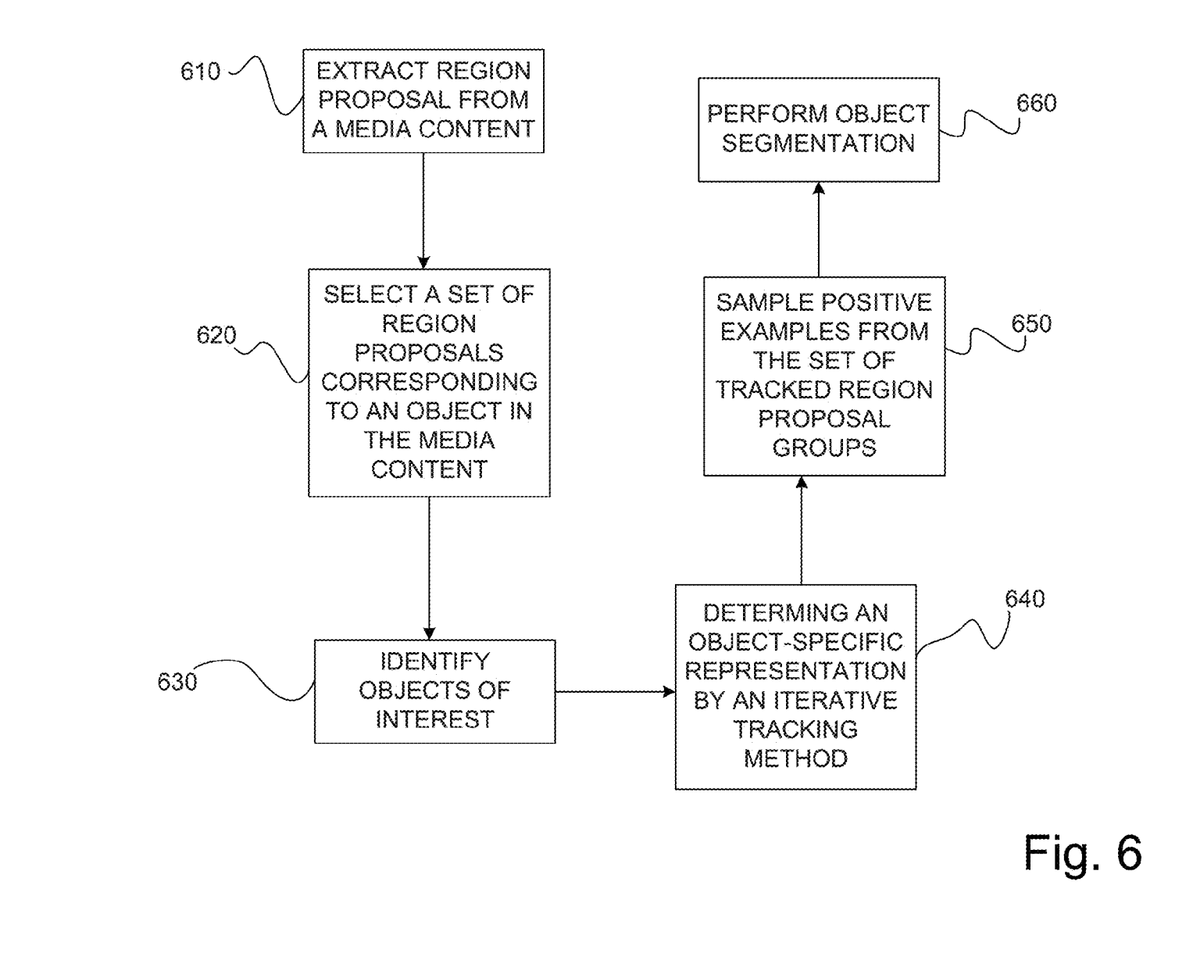
FIG. 6 is a flowchart illustrating a method according to an embodiment.

FIG. 6 is a flowchart illustrating a method according to an embodiment. A method comprises extracting region proposals from a media content 610; selecting a set of region proposals corresponding to an object in the media content 620; identifying objects of interest 630; determining an object-specific representation by an iterative tracking method 640; sampling positive examples from the set of tracked region proposal groups obtained from the iterative tracking method 650; and performing object segmentation 660.

An apparatus according to an embodiment comprises means for extracting region proposals from a media content; selecting a set of region proposals corresponding to an object in the media content; identifying objects of interest; determining an object-specific representation by an iterative tracking method; sampling positive examples from the set of tracked region proposal groups obtained from the iterative tracking method; and performing object segmentation.

These means may comprise a processor, a memory, and a computer program code residing in the memory.

The various embodiments may provide advantages. Existing image classifier can be used to achieve the challenging semantic video object segmentation problem, without the need of large-scale pixel-level annotation and training.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   extracting region proposals from a media content;
   selecting a set of region proposals corresponding to an object in the media content;
   identifying objects of interest;
   determining a confidence map for the extracted region proposals that accounts for a region-wise score and a classification confidence;
   generating another set of region proposals by slicing the confidence map;
   determining an object-specific representation by an iterative tracking method;
   sampling positive examples from the set of tracked region proposal groups obtained from the iterative tracking method; and
   performing object segmentation.

2. The method according to claim 1, further comprising determining motion information by creating a binary map.

3. The method according to claim 2, further comprising determining the region-wise score by combining a static objectness score associated with each proposal from the extracted region proposals with an average and total amount of motion information encompassed by region in the created binary map.

4. The method according to claim 1, wherein slicing the confidence map comprises slicing the confidence map at a level that varies with each disconnected region sliced at each level forming another region proposal.

5. The method according to claim 1, wherein the iterative tracking method comprises forming a pool of candidates by taking region proposals from a plurality of frames and selecting a region proposal on the earliest frame; tracking the selected region until the last frame, choosing all the region proposals overlapping with the tracked region to form a group to be removed from the pool, repeating the steps until the pool is empty.

6. The method according to claim 5, further comprising determining a stability indicator for each group by a number of overlapped region proposals during tracking related to other groups.

7. The method according to claim 6, further comprising for each group sampling region proposals proportional to group's stability indicator.

8. An apparatus, comprising at least one processor and at least one memory, said at least one memory stored with a computer program thereon, which when executed by said at least one processor, causes the apparatus to extract region proposals from a media content;
select a set of region proposals corresponding to an object in the media content;
identify objects of interest;
determine a confidence map for the extracted region proposals that accounts for a region-wise score and a classification confidence;
generate another set of region proposals by slicing the confidence map;
determine an object-specific representation by an iterative tracking method;
sample positive examples from the set of tracked region proposal groups obtained from the iterative tracking method; and
perform object segmentation.

9. The apparatus according to claim 8, further comprising a computer program to cause the apparatus to determine motion information by creating a binary map.

10. The apparatus according to claim 9, further comprising a computer program to cause the apparatus to determine the region-wise score by combining a static objectness score associated with each proposal from the extracted region proposals with an average and total amount of motion information encompassed by region in the created binary map.

11. The apparatus according to claim 8, wherein the computer program to cause the apparatus to slice the confidence map comprises a computer program to cause the apparatus to slice the confidence map at a level that varies with each disconnected region sliced at each level forming another region proposal.

12. The apparatus according to claim 8, further comprising a computer program to cause the apparatus to perform iterative tracking by forming a pool of candidates by taking region proposals from a plurality of frames and selecting a region proposal on the earliest frame;
tracking the selected region until the last frame; choosing all the region proposals overlapping with the tracked region to form a group to be removed from the pool: and repeating the steps until the pool is empty.

13. The apparatus according to claim 12, further comprising a computer program to cause the apparatus to determine a stability indicator for each group by a number of overlapped region proposals during tracking related to other groups.

14. The apparatus according to claim 13, further comprising a computer program to cause the apparatus to sample for each group region proposals proportional to group's stability indicator.

15. A computer program product embodied on a non-transitory computer readable medium, comprising computer program code configured to, when executed on at least one processor, cause an apparatus or a system to:
extract region proposals from a media content;
select a set of region proposals corresponding to an object in the media content;
identify objects of interest;
determine a confidence map for the extracted region proposals that accounts for a region-wise score and a classification confidence;
generate another set of region proposals by slicing the confidence map;
determine an object-specific representation by an iterative tracking method;
sample positive examples from the set of tracked region proposal groups obtained from the iterative tracking method; and
perform object segmentation.

16. An apparatus, comprising
means for extracting region proposals from a media content;
means for selecting a set of region proposals corresponding to an object in the media content;
means for identifying objects of interest;
means for determining a confidence map for the extracted region proposals that accounts for a region-wise score and a classification confidence;
means for generating another set of region proposals by slicing the confidence map;
means for determining an object-specific representation by an iterative tracking method;
means for sampling positive examples from the set of tracked region proposal groups obtained from the iterative tracking method; and
means for performing object segmentation.

17. The apparatus according to claim 16, further comprising means for determining motion information by creating a binary map.

18. The apparatus according to claim 17, further comprising means for determining the region-wise score by combining a static objectness score associated with each proposal from the extracted region proposals with an average and total amount of motion information encompassed by region in the created binary map.

19. The apparatus according to claim 16, wherein the means for generating another set of region proposals comprises means for slicing the confidence map at a level that varies with each disconnected region sliced at each level forming another region proposal.

20. The apparatus according to claim 16, further comprising means for performing iterative tracking by forming a pool of candidates by taking region proposals from a plurality of frames and selecting a region proposal on the earliest frame; by tracking the selected region until the last frame; by choosing all the region proposals overlapping with the tracked region to form a group to be removed from the pool: and by repeating the steps until the pool is empty.

* * * * *